Oct. 16, 1928.  1,687,720
F. GARNER
HYDRAULIC STEERING MECHANISM
Filed Jan. 31, 1927   2 Sheets-Sheet 2
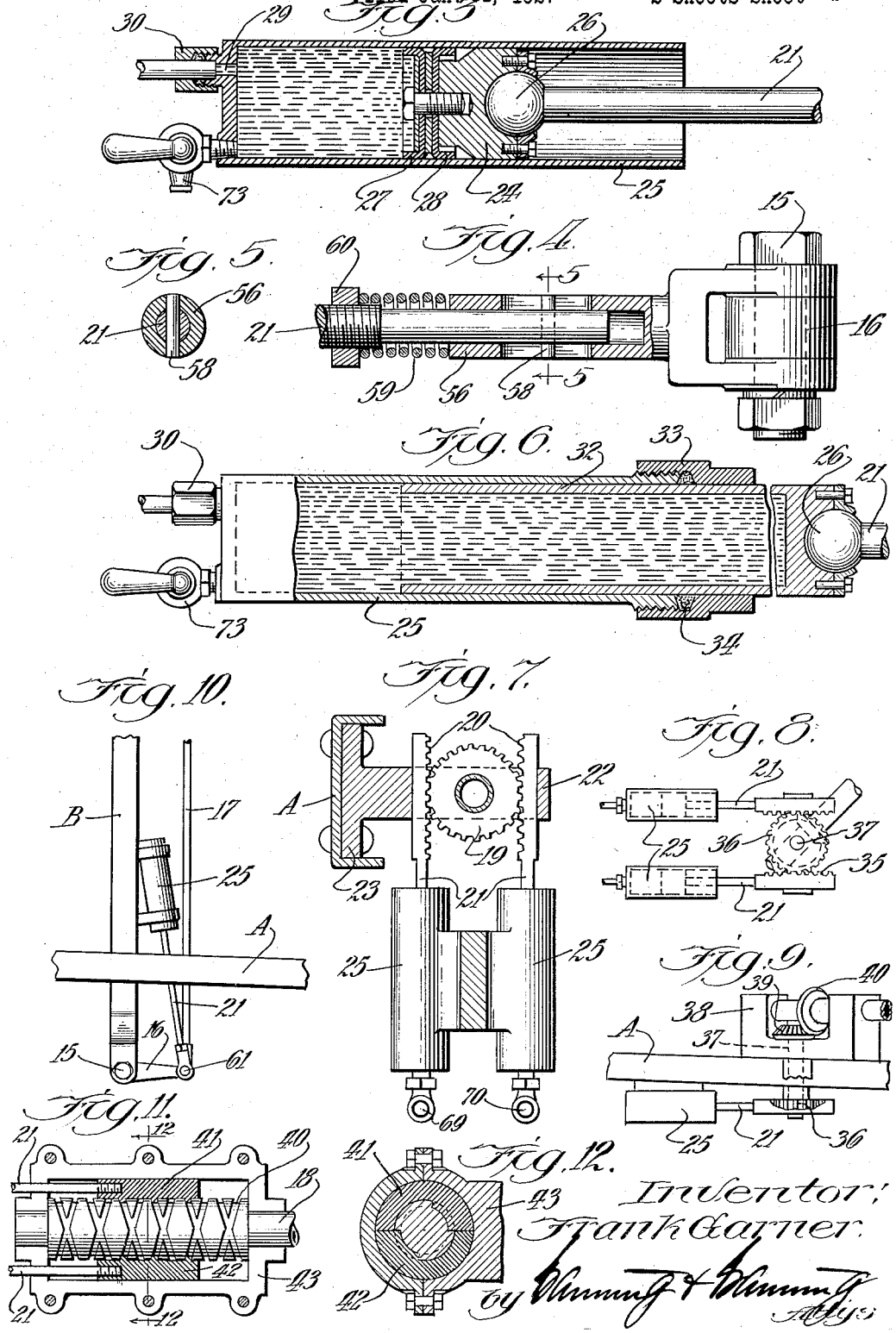

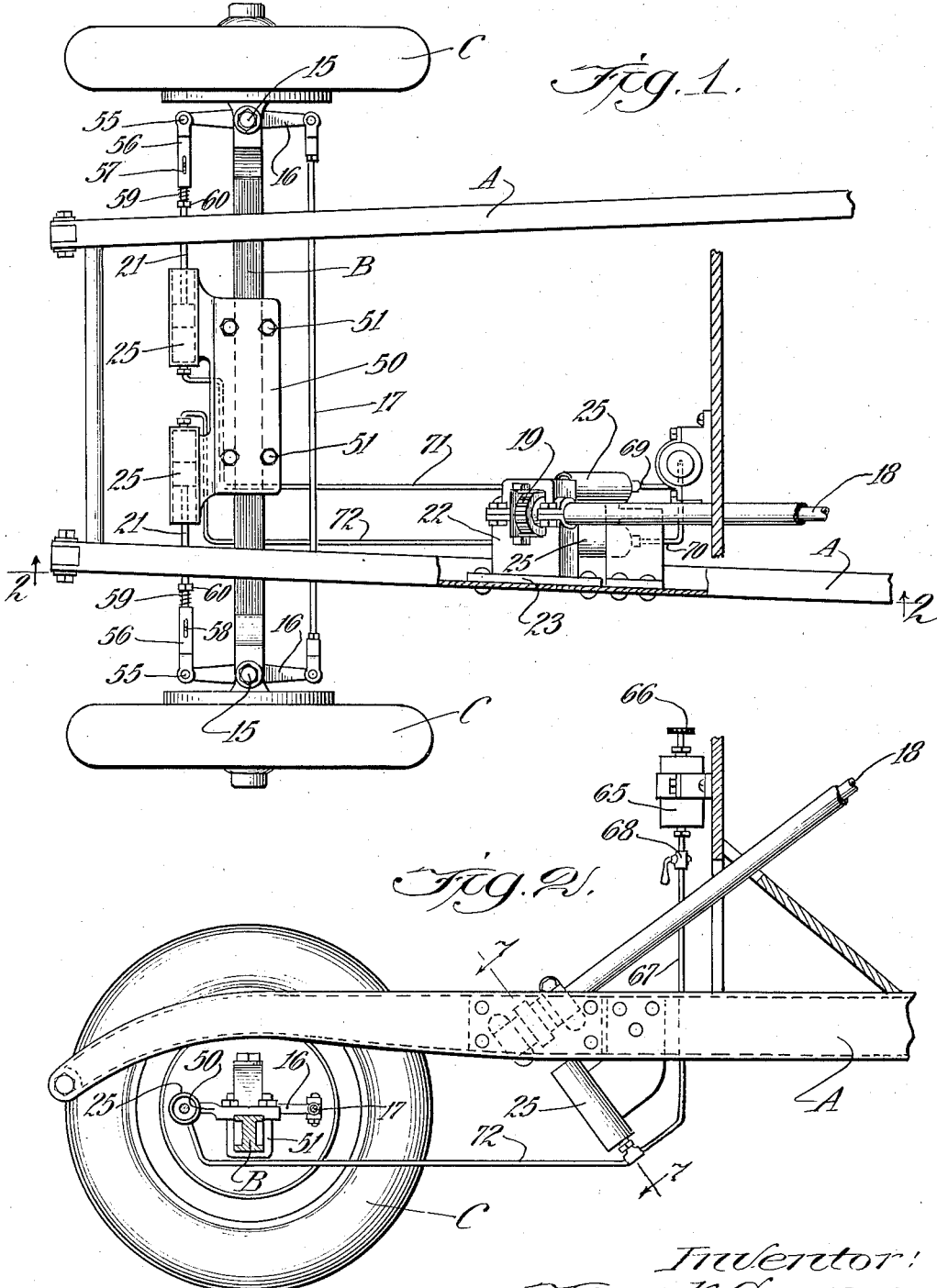

Patented Oct. 16, 1928.

1,687,720

UNITED STATES PATENT OFFICE.

FRANK GARNER, OF CHICAGO, ILLINOIS.

HYDRAULIC STEERING MECHANISM.

Application filed January 31, 1927. Serial No. 164,783.

This invention relates to a mechanism, operated by hydraulic means, which may be used advantageously for steering an automobile. It comprises certain elements, few in number, which are easily formed and assembled and which operate with a minimum of effort and wear.

It is a primary object of my invention to produce a structure, having the characteristics noted, which will be easier to control than the mechanical type of steering apparatus now in general use. Shocks from the road which are commonly transmitted back to the steering control in the types of mechanism now prevalent are prevented from doing so in the apparatus of my invention. The wheels at the front of the vehicle which are moved for steering purposes, are also held against shimmying or wabbling, this being a characteristic which has developed with vehicles having certain equipment.

With the end in view of attaining these and other objects, as will more fully hereinafter appear, I have devised the present steering apparatus of which certain embodiments are illustrated in the accompanying drawings in the manner following:

Figure 1 is a view in plan of the front end of an automobile chassis equipped with the present steering mechanism;

Fig. 2 is a vertical section taken on line 2—2 of Fig. 1;

Fig. 3 is a longitudinal section through one of the hydraulic cylinders in which is arranged a piston;

Fig. 4 is an enlarged detail in longitudinal section showing one end of the piston rod and its slip connection with the associated steering arm;

Fig. 5 is a transverse section therethrough on line 5—5 of Fig. 4;

Fig. 6 is a longitudinal section through a cylinder equipped with a plunger, the view being otherwise similar to Fig. 3;

Fig. 7 is an enlarged detail in section taken on line 7—7 of Fig. 2, showing one type of hydraulic cylinder unit which may be associated with the steering post;

Fig. 8 is a side elevation of another type of hydraulic cylinder unit designed for mounting upon the outer side of one of the side members of the chassis;

Fig. 9 is a view in plan thereof together with its connection to the lower end of the steering post;

Fig. 10 is a fragmentary plan view showing a modified form of connection between one of the hydraulic cylinders and the tie rod extending between the steering arms which control movements of the vehicle front wheels;

Fig. 11 is a fragmentary longitudinal section through the lower end of the steering post showing a modified type operative connection therefrom to the associated hydraulic cylinders; and Fig. 12 is a transverse section therethrough on line 12—12 of Fig. 11.

The present apparatus is designed for use with an automobile having the usual chassis with longitudinal side members A, preferably of channel formation. Supported below the forward ends of the channel members is the front axle B carrying at its two ends king pins 15 which form pivotal connections for the spindles whereon are mounted the dirigible steering wheels C. Connected with the spindles and extending forwardly and rearwardly thereof are the usual steering arms 16 having a common connection in the cross tie rod 17. The vehicle is also equipped with a steering control consisting in part of a post or shaft 18 which is extended within a suitable tube forming a column. Near its lower end a pinion 19 is carried fast on the post, as best shown in Fig. 1. The parts thus far described are common to automobiles of the present day, and reference thereto has been made solely to a better understanding of the present hydraulic mechanism which is associated therewith.

Referring more particularly to Figs. 1, 2, and 7, the pinion 19 at the lower end of the steering post is in meshing relation with rack teeth 20 formed on a pair of rods 21 which are arranged in parallelism on opposite sides of the pinion. These rods may be slidably mounted in a guide block 22 extending from a base 23 which is bolted or otherwise made fast to the inside of the channel member A. The two rods 21 form part of a duplex cylinder mechanism of which two suggested constructions are set forth in Figs. 3 and 6. In the former of these figures, the rod is connected with a piston 24 slidably mounted in a cylinder 25. The connection between the rod and piston may, if desired, be universal by the provision of a ball joint 26, and, as shown, a pair of oppositely facing cup washers 27 and 28 may be carried by the piston so as to form a leak-tight seal within the cylinder wherein is received any suitable hydraulic pressure medium for moving the piston. As shown, a port 29 through which liquid enters and leaves the cylinder is provided adjacent one end thereof, this port being extended within a nipple to which may be applied a coupling nut 30 for establishing a tight connection with a pipe line.

A suggestive modification of the construction just described is set forth in Fig. 6 wherein the cylinder 25 accommodates a hollow plunger 32, having its outer end provided with a head to which connection is made with the rod 21. The cylinder and piston are in open communication between their opposite ends and liquid is receivable therewithin through an inlet the same as is shown in Fig. 3. At the open end of the cylinder is a collar 33 adjustable to compress a packing 34 around the plunger so as to prevent leakage of liquid from the cylinder.

The cylinders which are associated with the steering post are shown in Figs. 1 and 2 as disposed wholly to the inside of the channel member A. If desired, however, the construction suggested in Figs. 8 and 9 may be followed. In this case, I have located the two cylinders upon the outer side of the channel member to which they are connected. The rods 21 associated with these cylinders are provided at their outer ends with rack teeth 35 which engage with opposite sides of a pinion 36 mounted on a shaft 37 which is extended through the channel member. As shown, a bearing block 38 affixed to the inner side of the channel may provide a support for this shaft which carries at its inner end a beveled gear 39 adapted to mesh with a like pinion 40 at the lower end of the steering shaft which may also be journaled in the bearing block 38. This construction provides for a transmission of movement from the steering post to the pinion 36, thereby setting in operation the two cylinder mechanisms which are disposed upon the outer side of the channel member.

A further type of connection between the steering post and pressure cylinders is suggested in Figs. 11 and 12. I have here shown the lower end of the steering post as equipped with traversing threads 40 reversely pitched to drive in opposite directions a pair of collars 41 and 42 which are arranged upon opposite sides of the post. The two collars are provided with teeth each engaging one set of threads so that their movements in response to turning of the post will be in opposite directions simultaneously. The two collars are slidably mounted within a suitable frame 43 in which their sliding movements are confined. This frame is preferably attached to the channel member of the chassis frame. Extending from the two collars are a pair of rods 21 in connection, respectively, with two cylinder mechanisms (not shown) which may be similar to the ones already set forth.

In the region of the front axle I mount a pair of cylinder mechanisms which, if desired, may follow either of the constructions already described. As shown in Fig. 1, a pair of such cylinders 25 in mutual alignment are carried upon a bracket plate 50 which is secured fast to the axle with the aid of U-bolts 51. These two cylinders are oppositely faced so that the rods 21 of their pistons or plungers are extended laterally toward the front wheels of the vehicle. For transmitting steering movements to the wheels, a hook-up, such as is shown in Fig. 1, may be employed, although this is merely suggestive of several which are available for this purpose. The two steering arms 16 are shown as extended forwardly of the king pins for pivotal connection as at 55 with a tubular arm 56 through which is a longitudinal slot 57. The outer ends of the rods 21 are entered within these arms, and preferably carry cross pins 58 which are slidable within the confines of the slots 57 so as to establish a slip connection therewith. It is desired, however, that such slippage should normally be prevented, and for this purpose I surround each of the rods 21 with a coiled spring 59 which is compressed between the end of the tubular arm 56 and a nut 60 having an adjustable mounting upon a threaded portion of the rod 21. Each of the rods 21 is similarly equipped with a yielding connection in which the two springs 59 are opposed in balanced relation. By the provision of these yielding connections, I have made it possible for the front vehicle wheels to swerve slightly in response to shocks from the road, but without transmitting these shocks through the steering mechanism to the hand control therefor.

In Fig. 10 I have suggested a slightly modified type of connection between one cylinder mechanism 25 and the steering arm. In this case each of the cylinders (of which but one is shown) is mounted independently of the other upon the front axle and in diverging relation thereto so that its rod 21 is inclined rearwardly toward the pivotal connection 61 between the tie rod and steering arm. This rod 21 forming part of the cylinder mechanism connects with the end of the tie rod at which point is also the pivotal connection therewith of the steering arm. If desired, a yielding connection (not shown) may be interposed between this cylinder rod and the pivot 61 which joins the ends of the tie rod with the steering arm.

In connecting up for operation the several cylinder mechanisms already described, I prefer to use a reservoir in the form of a small supply tank 65 having a mounting, if desired, upon the bulkhead which upstands from the forward end of the automobile body. Within this reservoir may be provided a pressure means actuated by a handle 66 so as to assure a desired condition of pressure throughout the entire hydraulic system. From the reservoir, preferably at its lower end, leads a pipe 67 which may have a shut-off valve 68 therein. This pipe is in connection as at 69 and 70 with the two pressure cylinders associated with the steering post. Extending from these cylinders are two pipe lines 71 and 72, respectively, which connect with the steering cylinders adjacent the front axle. In each of the latter cylinders is provided a bleed valve 73 for the exhaustion of any air which may be trapped in the system.

With application of a rotary force to the steering post 18, pressure and suction forces are created in the two associated pressure cylinders. As a separate pipe line connects these cylinders with the steering cylinders at the front of the vehicle, there is transmitted a pressure force to one and a suction force to the other. As the two steering cylinders are oppositely faced, the net result of this operation is to set up a single force proceeding laterally one way or the other so as to swerve the steering wheels. From time to time, as occasion may require, additional fluid may be added to the reservoir whereby a working supply is always assured.

In case of failure in the present mechanism, so that one of the cylinders is incapable of operating, as intended, it will still be possible to perform steering. This is due to the fact that from each pressure cylinder a force, either pressure or suction, is transmitted to one steering cylinder at the front axle, two such forces, equal but opposite, being applied thereto at all times. Each movement of the steering post establishes a suction in one pipe line extending between two of the cylinders and a corresponding pressure in the other pipe line between the other two cylinders, the result being that the action of the one is complementary to that of the other. Should either pipe line break, or should either or both cylinders in connection therewith become inoperative, the two cylinders in connection with the remaining pipe line will continue to function. Both suction and pressure forces will be transmitted alternately through a single pipe line, instead of two, in case of one being out of commission. The hydraulic steering apparatus herein described has in actual practice demonstrated its merit and capacity to perform as stated.

I claim:

1. In combination with an automobile having a pair of dirigible wheels each provided with a steering arm, a tie rod connection between the two arms, two cylinder mechanisms, two slip connections extending between the cylinder mechanisms and steering arms, spring means associated with said connections for normally preventing slippage therein, the spring means in the one connection exerting a force opposite to that in the other whereby the two are balanced, and means for applying simultaneously to the two cylinder mechanisms opposite and equal forces whereby the connections therefrom to the steering arms are actuated, substantially as described.

2. In combination with a vehicle having a pair of dirigible wheels each provided with an arm extending forwardly and rearwardly of its steering axis, a tie rod connection between one end of each arm, a pair of cylinder mechanisms one connected to the other end of each arm, and means for transmitting to the two cylinder mechanisms a fluid force whereby to turn the dirigible wheels in unison, substantially as described.

FRANK GARNER.